Figure 3:
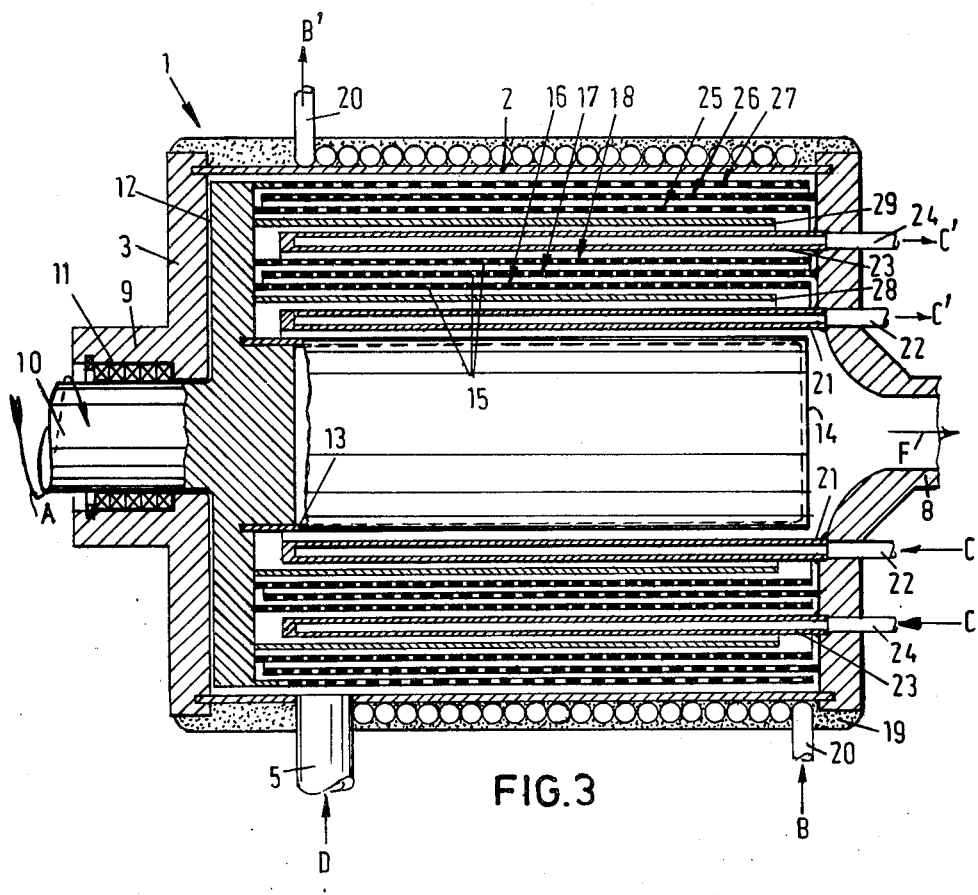

United States Patent
ter Braak

[11] 3,910,346
[45] Oct. 7, 1975

[54] MIXER

[75] Inventor: Johannes Gerardus ter Braak, Schiedam, Netherlands

[73] Assignee: Gebrs. Ter Braak B.V., Rotterdam, Netherlands

[22] Filed: Jan. 23, 1974

[21] Appl. No.: 435,860

[52] U.S. Cl. ............ 165/109; 259/9; 259/DIG. 30
[51] Int. Cl.² ........................................ F28F 13/12
[58] Field of Search ... 165/109; 259/9, 10, DIG. 30, 259/DIG. 18

[56] References Cited
UNITED STATES PATENTS

| | | | |
|---|---|---|---|
| 705,745 | 7/1902 | Fliegel | 165/109 |
| 1,483,742 | 2/1924 | Nicol | 259/DIG. 30 |
| 2,119,346 | 5/1938 | Page | 165/109 |
| 2,367,279 | 1/1945 | Houlton | 259/DIG. 30 |
| 2,587,127 | 2/1952 | Erickson | 259/10 |
| 2,632,089 | 3/1953 | Buckmaster | 165/109 |
| 2,734,728 | 2/1956 | Myers | 259/DIG. 30 |
| 2,774,577 | 12/1956 | Anderson | 259/9 |
| 2,898,092 | 8/1959 | DeHaven Miller | 165/109 |
| 3,187,802 | 6/1965 | Hickey | 259/9 |
| 3,367,126 | 2/1968 | Howell | 259/9 |

Primary Examiner—Albert W. Davis, Jr.
Assistant Examiner—Daniel J. O'Connor
Attorney, Agent, or Firm—Snyder, Brown and Ramik

[57] ABSTRACT

An apparatus for mixing, cooling or heating fluids, comprising a cylindrical housing with fluid inlet and outlet means, and with interior and exterior cooling or heating means. Inside the housing, there is at least one group of coaxial, cylindrical sleeves provided with fluid passages. At least one of the sleeves in each group rotates in one sense and at least another sleeve of that group is stationary or rotates in another sense, thus giving a high mixing effect. In a special embodiment, there are several groups of perforated sleeves, positioned around a central agitating shaft and spaced by solid sleeves and by interior cooling or heating bodies.

7 Claims, 3 Drawing Figures

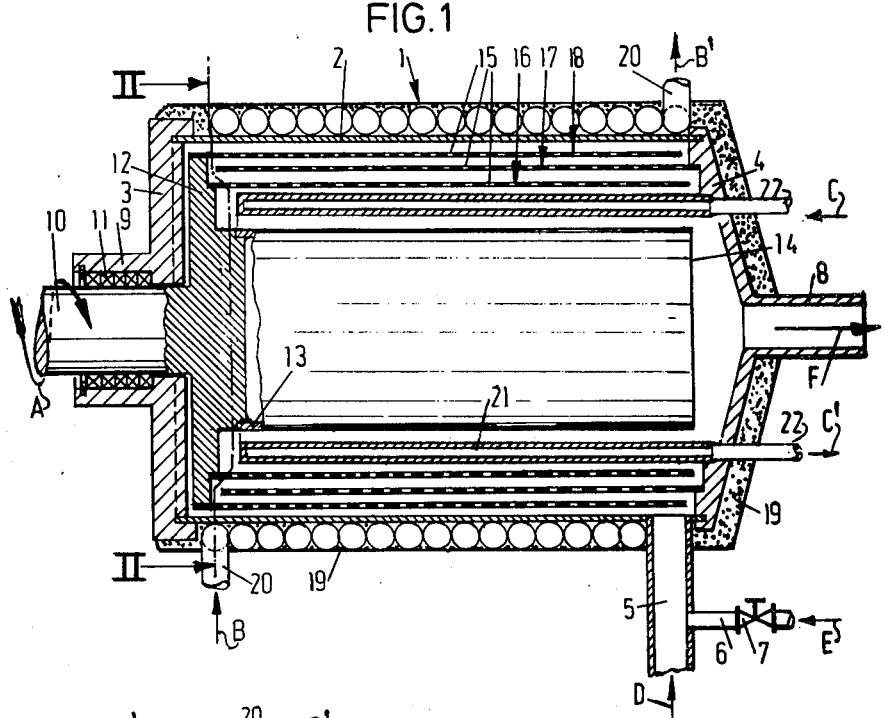
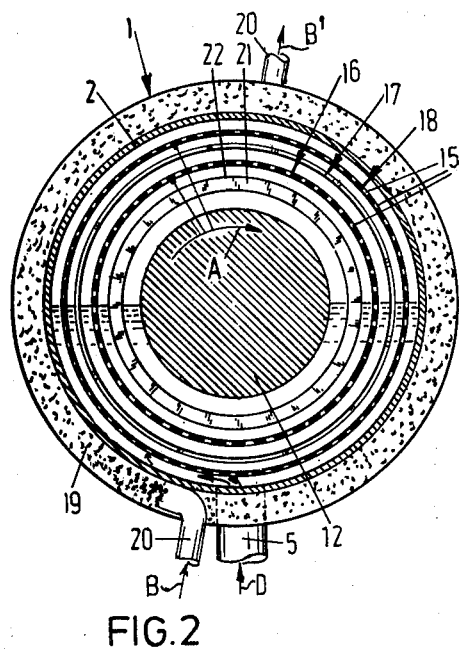

MIXER

This invention relates to apparatus for mixing, cooling and heating fluids.

In bakeries and candy factories, there is need for an apparatus which can perform the task of aerating egg white with air to form foamed products, or in general the task of mixing two or more fluids, such as a liquid and a gas, or two liquids or two gases, with each other. The invention has for its object to provide an apparatus for such purpose, which apparatus should operate in a rapid and effective way and should allow the user also to reach related purposes.

The invention provides an apparatus of the aforesaid type, comprising a closed cylindrical housing having an inlet for fluids in its cylindrical wall and an outlet for fluids in one of its end walls, and one or more groups of coaxial, cylindrical sleeves provided with a plurality of passages for fluids and positioned within the housing, at least one sleeve in each group of sleeves being mounted for rotation in one sense along its cylinder axis and at least one other sleeve in each group of sleeves being mounted stationary or mounted for rotation in opposite sense along its cylinder axis, and further comprising cooling and/or heating bodies positioned outside and within the housing.

The invented apparatus has a rapid and effective mixing operation. When two or more fluids, such as a liquid and a gas, are passed through this mixer, the rotating and the stationary (or oppositely rotating) sleeves will exert high shearing forces onto these fluids so as to cause them to reach a turbulent state along their passage through the apparatus and to bring about an extensive mixing effect of these fluids. The heat liberated during mixing may be removed by means of a cooling fluid within the cooling or heating bodies. Further, the apparatus is also suitable for treating substances which need not to be mixed but only to be cooled and agitated or heated and agitated, such as a fondant paste which has to be crystallised.

Some embodiments of the invented apparatus will now be described in further detail with reference to the accompanying drawings which are given only by way of example.

FIG. 1. is a longitudinal section through a first embodiment.

FIG. 2. is a cross-section along the line II—II of FIG. 1.

FIG. 3. is a longitudinal section through a second embodiment.

The embodiment of FIGS. 1 and 2 comprises a horizontably mounted cylindrical housing 1 having a cylindrical wall 2, a straight end wall 3 and a tapered end wall 4. An inlet 5 for fluids to be treated is provided in the cylindrical wall 2 adjacent the end wall 4 and carries a branch conduit 6 provided with a valve 7 at the outside of the housing. An outlet 8 for treated products has been provided centrally in the tapered end wall 4.

A horizontal and rotatable shaft 10 penetrates into the housing and is guided by a central hub 9 of the straight end wall 3, the shaft being sealed against the hub by means of a packing 11. At the inside of the housing 1, the shaft 10 carries a disc 12 extending perpendicular to the shaft and capable of rotating with it. This disc 12 has been positioned with a slight clearance near the end wall 3 and reaches with its circumference into the vicinity of the cylindrical wall 2. Beyond the disc 12, the shaft 10 meets a hollow agitating shaft 13 of greater diameter which extends along the entire length of the housing into the vicinity of the tapered end wall 4 and has a closed end 14 there.

Positioned within the housing, at a short distance from the cylindrical wall 2, is a group of three cylindrical sleeves 16, 17, 18 which have been mounted coaxially to each other and to the cylindrical wall. These sleeves are provided with a plurality of passages 15 and are made e.g. of perforated metal sheet or of metal gauze. The passages 15 may have any desired shape, e.g. circular, elongated, hexagonal or the like, and need not necessarily have the same shape and dimensions in all sleeves of the group. The middle sleeve 17 has been attached to the tapered end wall 4 of the housing and will always remain stationary thereby but the two other sleeves 16, 18 each are attached with one of their ends to the disc 12 and will thereby rotate together with that disc along their axes. Clearances are present between the free end of sleeve 17 and the disc 12 at one hand and between the free ends of sleeves 16, 18 and the wall 4 of the housing at the other hand.

The housing 1 is surrounded by a cooling or heating jacket 19 which includes a helically wound conduit 20 for cooling or heating fluid. Further positioned in the space between the inner sleeve 16 and the agitating shaft 13, is a cylindrical double-walled cooling or heating body 21 which extends substantially along the entire length of the housing. One end of body 21 has been attached to the end wall 4 and is connected there with feeding and draining conduits which penetrate through this wall. The other end of body 21 is ending at such a distance from the rotating disc 12 that a passage for substances to be treated is left between this body and the disc.

The described apparatus operates as follows:

During operation, the shaft 10 is caused to rotate in the sense of arrow A by means of driving means (not shown). The agitating shaft 13 as well as the disc 12 and the sleeves 16, 18 will rotate then in the same sense whilst sleeve 17 is remaining stationary. In the case that a heat-sensible liquid has to be mixed with a gas, a cooling fluid is passed through conduit 20 and body 21 in the direction of arrows B, B' and C, C'. The liquid, e.g. egg white, is fed to the apparatus by means of a pump (not shown) through inlet 5 in the direction of arrow D, and the gas, e.g. air, is introduced under a certain pressure through the same inlet 5 from branch conduit 6 (according to arrow E). Both fluids continue to flow within the housing under influence of the feeding pressure. First they flow through the space between cylindrical wall 2 and cooling body 21 in the direction of disc 12 and then after passing the passage between this disc and body 21, they flow through the space between said body and shaft 13 in the direction of the tapered end wall 4. Finally they leave the apparatus through central outlet 8 according to arrow F.

During the first part of their path through the apparatus, the liquid and gas are free to pass through the passages in sleeves 16, 17, 18, and they may do so in forward and backward direction. Strong shearing forces are exerted them onto these flowing substances, thanks to the rotation of sleeves 16, 18 in contradiction to the stationary position of sleeve 17, cylindrical wall 2 and cooling body 21. These shearing forces cause a strong agitating effect to take place and this ensures a good distribution of the flowing substances along the whole circumference of the cylindrical housing. To this agitating effect are added the shearing forces exerted by the rotating agitation shaft 13 and the stationary body 21 onto the substances during the second part of their path. As a result thereof a rapid and effective mixing operation of liquid and gas and in the case of egg white and air, a rapid aeration of the egg white is taking place. Moreover, the air fed under pressure into the apparatus may expand therein and thus improve the aerating effect. The heat liberated during mixing is rapidly removed by means of the cooling fluid in bodies 20,21. The product leaving the apparatus through outlet 8 is homogeneously mixed in this way and has a controlled temperature.

It will be understood that the apparatus of FIGS. 1 and 2 may be used for many other purposes. In one of these applications, a heating fluid may be passed through the bodies 20,21.

The embodiment of FIG. 3 is a variant to that of FIGS. 1 and 2. A difference is formed by doubling the interior cooling or heating body and doubling the group of perforated sleeves. Another difference is formed by the presence of additional partition walls in the form of solid sleeves 28,29 which are rotatable along their cylinder axes. These solid sleeves are attached with one of their ends to the disc 12 and reach with the other of their ends to the vicinity of the end wall 4.

Positioned in sequence within the space between the agitating shaft 13 and the cylindrical wall 2 are (seen from the inside to the outside): a cooling body 21, a solid sleeve 28, a group of perforated sleeves 16,17,18, a cooling body 23, a solid sleeve 29 and a group of perforated sleeves 25,26,27. Moreover, the inlet 5 has been shifted now to a place adjacent the end wall 3. In the arrangement as shown, the fluid streams are forced to follow a path having a length equal to five times (in stead of two times) the length of the housing and this means a high extension of the flow path and a strong improvement of the agitating and mixing effect.

It will be understood that many additional variants are possible within the scope of the invention. Thus, the agitating shaft 13 in FIGS. 1, 2 and 3 may be substituted by a worm. Further, several characteristics of FIG. 3 may be substituted separately in the embodiments of FIGS. 1 and 2. The sleeve 17 need not always be stationary but may sometimes be mounted for rotation in a sense opposite to that of the sleeves 16,18. Further, each group of sleeves may comprise a different number of sleeves than three, e.g. four or two times 3. The interior cooling bodies 21, 23 need not always be mounted stationary but may also be rotatable in the same sense as the adjacent sleeves or in the opposite sense. It will also be understood that the cooling bodies may serve as heating bodies in some instances.

The invented apparatus may be used for mixing two liquids (such as yoghurt with a protein solution), mixing a liquid with air (such as egg white with air, or yoghurt with air or a mixture of fat and powdered sugar with air) or mixing paste with air or liquid. In some cases, the apparatus only serves for cooling and agitating fluids. All variants may be used with atmospheric, superatmospheric or subatmospheric pressures.

What I claim is:

1. Apparatus for treating fluids comprising, in combination:

a cylindrical housing having a cylindrical wall and opposite end walls defining a closed chamber;

fluid inlet means connected to said cylindrical wall for introducing fluid into said chamber and fluid outlet means connected centrally to one of said end walls for discharging fluid from said chamber;

drive means projecting centrally through that other end wall opposite said one end wall and including a rotatable disc closed spaced adjacent said other end wall and an agitating shaft fixed centrally to said disc and projecting axially to a point closely spaced from said one end wall, said agitating shaft being of greater diameter than said outlet means so as to constrain fluid to flow around the free end of said agitating shaft in passing to said outlet means;

a hollow heat exchange sleeve-like body fixed to said one end wall and disposed coaxially of said agitating shaft to define an annular space therewith, said body terminating adjacent to but spaced from said disc;

a first sleeve fixed to said disc coaxially of said body in surrounding, spaced relation thereto to define a second annular space therewith, said first sleeve terminating adjacent to but spaced from said one end wall;

a second sleeve coaxial with and surrounding said first sleeve to define a third annular space therewith, said second sleeve being fixed to said one end wall and terminating adjacent to but spaced from said disc;

a third sleeve fixed to said disc and disposed coaxially of and in surrounding relation to said second sleeve to define a fourth annular space therewith, said third sleeve terminating adjacent to but spaced from said one end wall;

said first, second and third sleeves being perforate;

means for flowing heat exchange medium through said hollow heat exchange body; and heat exchange means surrounding said cylindrical wall.

2. Apparatus as defined in claim 1 including an imperforate sleeve fixed to said disc and located within said second annular space between said heat exchange body and said first sleeve, said imperforate sleeve terminating adjacent the free end of said first sleeve.

3. Apparatus as defined in claim 2 wherein said imperforate sleeve terminates short of the free end of said first sleeve.

4. Apparatus as defined in claim 2 including a second, hollow heat exchange sleeve-like body fixed to said one end wall in surrounding relation to said third sleeve to define a fifth annular space therewith, said second body terminating adjacent to but spaced from said disc and including means for flowing heat exchange medium through said second body;

a fourth perforate sleeve fixed to said disc in surrounding relation to said second body to define a sixth annular space therewith, and terminating adjacent to but spaced from said one end wall;

a fifth perforate sleeve fixed to said one end wall in surrounding relation to said fourth sleeve to define a seventh annular space therewith, and terminating adjacent to but spaced from said disc;

a sixth perforate sleeve fixed to said disc in surrounding relation to said fifth sleeve to define an eighth annular space therewith, and terminating adjacent to but spaced from said one end wall.

5. Apparatus as defined in claim 4 including a second imperforate sleeve fixed to said disc and located within said sixth annular space between said second heat exchange body and said fourth perforate sleeve, said second imperforate sleeve terminating adjacent the free end of said fourth sleeve.

6. Apparatus as defined in claim 5 wherein said second imperforate sleeve terminates short of the free end of said fourth sleeve.

7. Apparatus as defined in claim 6 wherein the imperforate sleeve first mentioned terminates short of the free end of said first sleeve.

* * * * *